(12) United States Patent
Boeck et al.

(10) Patent No.: US 9,401,566 B2
(45) Date of Patent: Jul. 26, 2016

(54) CHARGING PLUG WITH CONTACT-FREE SWITCH DEVICE

(75) Inventors: Werner Boeck, Gross Umstadt (DE);
Bert Bergner, Bensheim (DE); Dusan Ondrej, Heppenheim (DE); Sebastian Zabeck, Weinheim (DE); Ulrich Buchmann, Eppertshausen (DE)

(73) Assignee: TE Connectivity Germany GmbH, Bensheim (DE)

( * ) Notice: Subject to any disclaimer, the term of this patent is extended or adjusted under 35 U.S.C. 154(b) by 220 days.

(21) Appl. No.: 14/111,450

(22) PCT Filed: Apr. 5, 2012

(86) PCT No.: PCT/EP2012/056372
§ 371 (c)(1),
(2), (4) Date: Oct. 11, 2013

(87) PCT Pub. No.: WO2012/139982
PCT Pub. Date: Oct. 18, 2012

(65) Prior Publication Data
US 2014/0106586 A1    Apr. 17, 2014

(30) Foreign Application Priority Data
Apr. 13, 2011    (DE) .......................... 10 2011 002 024

(51) Int. Cl.
*H02J 7/00*       (2006.01)
*H01R 13/639*    (2006.01)
(Continued)

(52) U.S. Cl.
CPC ............ *H01R 13/639* (2013.01); *B60L 3/0069* (2013.01); *B60L 3/04* (2013.01); *B60L 11/1818* (2013.01); *H01R 13/52* (2013.01); *H01R 13/70* (2013.01); *H01R 13/701* (2013.01); *B60L 2270/32* (2013.01); *B60L 2270/34* (2013.01);
(Continued)

(58) Field of Classification Search
USPC ......................................................... 320/109
See application file for complete search history.

(56) References Cited

U.S. PATENT DOCUMENTS 3,496,500 A    2/1970    Romary
5,751,135 A    5/1998    Fukushima et al.
(Continued)

FOREIGN PATENT DOCUMENTS

FR    2644301 A1    9/1990
JP    H01152416 U    10/1989
WO    WO2009/002076 A2    12/2008

OTHER PUBLICATIONS

International Preliminary Report on Patentability issued by the International Bureau of WIPO, Geneva, Switzerland, dated Oct. 15, 2013, for related International Application No. PCT/EP2012/056372; 5 pages.
(Continued)

*Primary Examiner* — Suchin Parihar
(74) *Attorney, Agent, or Firm* — Faegre Baker Daniels LLP

(57) ABSTRACT

The invention relates to a charging plug for connection to a charging socket of a device which is intended to be charged, for example, a motor vehicle which is at least partially driven by electrical energy, or a device which provides charging energy. In order to prevent the charging plug from prematurely becoming defective as a result of corrosion or electro migration, there is provision according to the invention for a switching device of the charging plug to be arranged partially inside and partially outside an enclosed conduction chamber.

16 Claims, 3 Drawing Sheets

(51) Int. Cl.
*H01R 13/52* (2006.01)
*H01R 13/70* (2006.01)
*B60L 11/18* (2006.01)
*B60L 3/00* (2006.01)
*B60L 3/04* (2006.01)
*H01R 13/627* (2006.01)
*H01R 13/703* (2006.01)

(52) U.S. Cl.
CPC ......... *H01R 13/6275* (2013.01); *H01R 13/7037* (2013.01); *H01R 13/7038* (2013.01); *H01R 2201/26* (2013.01); *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 6,371,768 | B1 | 4/2002 | Neblett et al. |
| 2010/0186702 | A1* | 7/2010 | Yaccarino .................... 123/1 A |
| 2011/0084819 | A1* | 4/2011 | Bergum et al. ............ 340/425.5 |
| 2011/0169447 | A1* | 7/2011 | Brown et al. ................. 320/109 |
| 2011/0193667 | A1* | 8/2011 | Botsch .......................... 335/219 |
| 2012/0126747 | A1* | 5/2012 | Kiko et al. .................... 320/109 |
| 2012/0129377 | A1* | 5/2012 | Chen ............................. 439/327 |
| 2012/0129378 | A1* | 5/2012 | Kiko et al. .................... 439/345 |
| 2012/0206100 | A1* | 8/2012 | Brown et al. ................. 320/109 |
| 2012/0234061 | A1* | 9/2012 | Inoue et al. ..................... 70/255 |
| 2012/0252250 | A1* | 10/2012 | Kurumizawa et al. ........ 439/304 |
| 2013/0134933 | A1* | 5/2013 | Drew et al. ................... 320/109 |
| 2014/0106586 | A1* | 4/2014 | Boeck et al. .................. 439/188 |
| 2015/0260835 | A1* | 9/2015 | Widmer et al. ............... 320/109 |

OTHER PUBLICATIONS

International Search Report and Written Opinion issued by the European Patent Office, dated May 18, 2012, for related International Application No. PCT/EP2012/056372; 9 pages.

Examination Report dated Aug. 21, 2015 (in Japanese language), issued by the Japanese Patent and Trademark Office for Japanese Application No. 2014-504266; 4 pages.

* cited by examiner

CHARGING PLUG WITH CONTACT-FREE SWITCH DEVICE

BACKGROUND OF THE DISCLOSURE

The invention relates to a charging plug for connection in an insertion direction to a charging socket of a device which is intended to be supplied with electrical charging energy or which provides the charging energy, having at least one plug contact which can be connected to a charging energy line so as to conduct charging energy, and having a switching device, in accordance with the switching state of which the supply with charging energy takes place, the switching device being constructed with a switching member which has a closed and an open switching state and with an actuation member for influencing the switching state.

Charging plugs of the above-mentioned type are generally known and are used, for example, for charging the batteries of at least partially electrically driven motor vehicles. The charging plug can be connected to a charging socket of the motor vehicle and/or a charging socket of the device which is constructed as a charging station and which provides the charging energy. Before the charging operation can be started, the switching state of the switching device is queried so that malfunctions, for example, owing to an incorrect plugging operation, can be prevented and other safety aspects can be taken into account. To this end, the switching device may be connected to another plug contact of the charging plug and a conductor, for example, an earthing line of the charging plug, so as to transmit signals. The charging plug may be constructed in such a manner that it meets the requirements of the draft of the standard IEC 61851-1 Ed. 2.0 or the standard which is derived from this draft.

Since charging stations and motor vehicles often stand in the open air during the charging operation, contamination and moisture may be introduced into the charging plug, the moisture in particular being able to damage current-carrying components of the charging plug in the long term owing to corrosion or electromigration, with the result that the function of the charging plug cannot be ensured in the long term.

BRIEF SUMMARY OF THE DISCLOSURE

An object of the invention is therefore to provide a charging plug of the type mentioned in the introduction, which can be used longer than known charging plugs in the open air.

This object is achieved for the charging plug mentioned in the introduction in that the energy conductor and the switching member are arranged inside and the actuation member is arranged outside an enclosed conduction chamber of the charging plug.

Owing to the enclosure of the conduction chamber, the components of the charging plug which are arranged therein are effectively protected from the introduction of moisture or contamination. If the actuation member is constructed as a passive component through which no current flows, it is susceptible to the disadvantageous influences of moisture less than the current-carrying switching member since no electromigration of the material of the actuation member can take place.

The solution according to the invention may be further improved by various configurations which are advantageous per se and which can be freely combined with each other. These configurations and the advantages associated therewith are set out below.

In a first advantageous configuration, the actuation member and the switching member may interact with each other in a contact-free manner so as to influence the switching state. The touch-free connection or contact-free connection between the actuation member and the switching member enables the spatial separation of the two members so that the switching member can be arranged inside the conduction chamber and the actuation member can be arranged outside the conduction chamber. The manually operable actuation member does not need to be sealed against moisture together with the switching member. Consequently, it is possible to dispense with sealing of the actuation member which is movably received in the charging plug, for example, using rubber seals which become brittle and permeable over time.

The charging energy line can be connected to the plug contact so as to conduct charging energy through the charging plug and be arranged at least partially inside the enclosed charging chamber. The actuation member may be connected to the switching member so as to influence the switching state thereof.

In another advantageous configuration, the switching state may be dependent on the position of the actuation member relative to the switching member. The actuation member may be constructed and integrated in the charging plug in such a manner that it is simple to manually actuate and, for example, to displace, so that the switching state can be simply changed by a user of the charging plug.

So that the actuation member and the switching member can interact with each other in a contact-free manner, the switching member may have in another advantageous configuration a switching sensor which converts physical properties in the environment thereof to a change of switching state. Furthermore, the switching device may have a switching source which brings about the physical properties detected by the switching sensor. This switching source may be arranged inside or outside the conduction chamber. In order to influence the switching state, the strength of the physical properties acting on the switching sensor may depend on the position of the actuation member relative to the switching member and/or the switching source. The actuation member may thus be constructed so as to influence the transmission of the physical properties from the switching source to the switching sensor.

In order to be able to change the switching state in a defined manner, in another advantageous embodiment the actuation member may be arranged in one of the switching states at least partially between the switching source and the switching sensor. In particular, the actuation member in the open switching state may protrude at least partially into a region which is arranged between the switching source and the switching sensor.

In order to be able to produce the contact-free influence of the switching state in a simple manner and with a low level of susceptibility to failure, in another advantageous configuration the switching sensor may be constructed as a magnet sensor, the switching source as a magnet and the actuation member as a member which influences the magnetic field of the magnet. The conduction of the magnetic field from the magnet to the magnet sensor is only slightly, if at all, influenced by media which are introduced into the charging plug outside the conduction chamber, for example, moisture or dirt.

So that the switching device can be operated without a separate energy source, the magnet may be constructed as a permanent magnet and the magnet sensor as a reed contact. The actuation member may be produced at least partially from a magnetically soft material.

If the actuation member is arranged in an open position at least partially between the switching sensor and the switching source, the actuation member may influence and in particular reduce the strength of the magnetic field of the switching source acting on the switching sensor. Consequently, the reed contact in this switching state, which may be the open switching state, may be open. If the actuation member is positioned in a closed position arranged remote from the open position, it may have less influence on the transmission of the magnetic field to the magnet sensor and the strength of the magnetic field on the magnet sensor may be higher. In the closed position, in which the closed switching state may be present, the magnetic field acting on the magnet sensor may close the reed contact.

In order to be able to actuate the actuation member in a simple manner, in another advantageous configuration the charging plug may be constructed with an actuation element which can be manually actuated and to which the actuation member is fixed. For example, the actuation element may be formed as an injection-moulded component which is at least partially injection-moulded round the actuation member. The actuation element may protrude at least partially from a housing of the charging plug so that it can be comfortably pressed by hand and, for example, can be pressed with a finger, from the open into the closed position, or vice-versa.

In order to safeguard the charging operation against undesirable separation, in another advantageous configuration the charging plug may have a catch device. So that the handling of the catch device and the switching device is simple and comfortable, the actuation element may be an actuation element of the catch device of the charging plug for securing the connection between the charging plug and the charging socket. The actuation element may be integrated in the catch device in one piece and may be formed, for example, together with the catch device as an injection-moulded component.

So that the catch device can interact with a counter-catch device of the charging socket, in another advantageous configuration the catch device may be arranged outside the conduction chamber.

The actuation element may be arranged in one of the switching states in a secured position and, in the other switching state, in a released position. In particular, the actuation element may be retained in the secured position in a resiliently biased manner. For example, the switching device may have in the released position the open switching state, in which the reed contact may be open and the actuation member may be arranged in the open position. In the secured position of the catch device, the actuation member may be arranged in the closed position and the switching device may have the closed switching state with the closed reed contact.

In another advantageous configuration, the charging plug may have a catch chamber which is arranged outside the charging chamber and which is at least partially open. The catch device may be arranged at least partially in the catch chamber. So that an end of the catch device which is located in the insertion direction and which is provided with a catch element can engage with the counter-catch device, the catch chamber may be open at least in the insertion direction. In order to prevent the catch device from colliding, for example, with a charging cable which is connected to the charging plug, and thereby being moved transversely relative to the insertion direction and potentially damaged, the catch chamber may be closed transversely relative to the insertion direction at least partially by a catch chamber wall of the charging plug.

In order to prevent dust or dirt that has been introduced into the catch chamber from impairing the function or the movability of the catch device and/or the switching device, in another advantageous configuration the catch chamber may be adjoined by a through-opening which is arranged in the catch chamber wall in the region of the switching device and by means of which the catch chamber is connected to the environment of the charging plug.

So that contamination which impedes the switching device can be removed in a selective manner, in another advantageous configuration the through-opening may be arranged in the insertion direction between the switching source and the switching sensor. The through-opening may advantageously open in a portion of the catch chamber in which the actuation member is at least partially introduced in the open position or in the released position when it protrudes between the switching sensor and the switching source.

In order to be able to remove or rinse out fluids or contamination from the catch chamber from the charging plug independently of position, the charging plug may be constructed with two through-openings which may be arranged at opposite sides of the charging plug. The openings may be arranged along a cleaning tunnel which extends through the catch chamber, the cleaning tunnel being able to be formed at least partially by the openings. In particular, the openings may be in alignment with each other.

In another advantageous configuration, the conduction chamber may be at least partially surrounded by a sealing wall, which engages in a sealing manner around a plug end which is located in the insertion direction. The sealing wall may, for example, be connected in a sealing manner to the plug end of the charging plug that has a plug face by means of an adhesive connection. Counter to the insertion direction, the plug wall may be connected in a sealing manner and, for example, also adhesively bonded, to a sleeve, through which the charging cable is guided into the charging plug in a sealed state.

The sealing wall may be formed as an inner housing wall of the charging plug, the housing and/or the plug member of the charging plug being able to be produced as an injection-moulded plastics component comprising at least two shells. The two shells may be adhesively bonded to each other along the sealing wall in a fluid-tight manner.

In order to automatically retain the catch device in the secured position or the switching device in one of the two switching states, and in particular in the open switching state, the charging plug may be constructed with a resilient element which, in the released position of the catch device or in the open position, in which the reed contact may be open, is resiliently pre-tensioned. The resilient element may be pressed by the catch device and, for example, by the actuation element thereof, against the sealing wall and seek to press the actuation element or the catch device from the released position into the secured position.

The charging plug may have a light source which, as a signal device, may indicate, for example, the charging state of the device which is intended to be charged and/or the operating state of the device which provides the charging energy or, as an illumination means, may facilitate assembly of the charging plug and socket.

The invention is explained below by way of example with reference to embodiments and the drawings. The various features of the configurations may be combined independently of each other, as already set out in the individual advantageous configurations.

DETAILED DESCRIPTION OF THE DISCLOSURE

The structure and function of a charging plug according to the invention will first be described with reference to the embodiment of FIG. 1.

Figure 1:
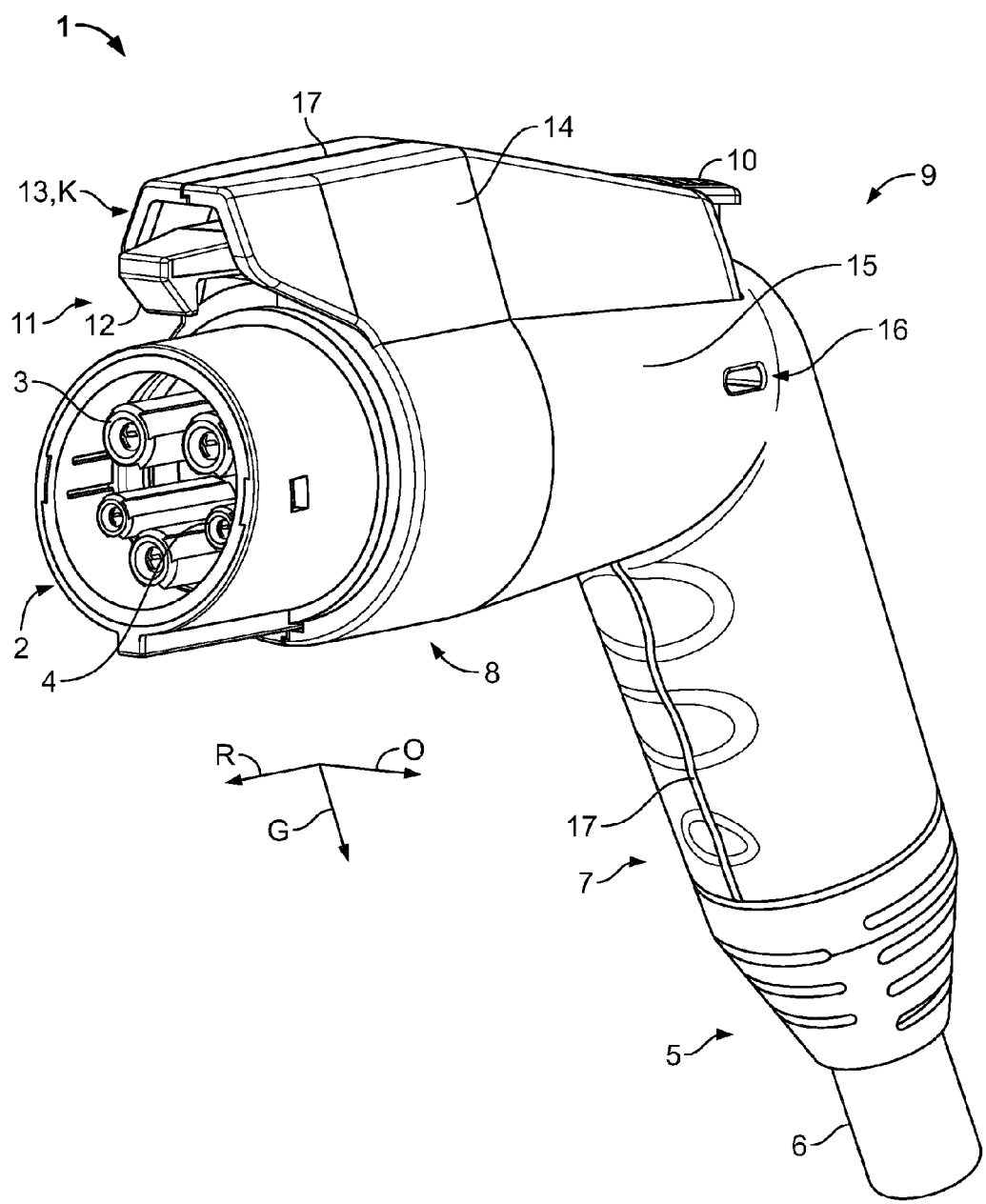
FIG. 1 is a schematic, perspective view of an embodiment of a charging plug according to the invention.

FIG. 1 is a schematic, perspective view of the charging plug 1 in which a plug face 2 of the charging plug 1 is directed in an insertion direction R in an inclined manner out of the plane of projection. The plug face 2 may have a plurality of plug contacts, a first plug contact 3 being able to be constructed so as to conduct charging energy and an additional plug contact 4 being able to be constructed so as to conduct signals. In particular, the plug face 2 of the charging plug 1 may be constructed in accordance with a draft of the standard IEC 61851-1 Ed 2.0 or in accordance with the standard which is derived from this draft.

A charging cable 6 may protrude into the charging plug 1 through an end 5 of the charging plug 1 directed away from the plug face 2. Conductors which are guided in the charging cable 6 can each be connected in an electrically conductive manner to one of the plug contacts 3, 4. For more simple handling, the charging plug 1 may be constructed in the manner of a pistol and so as to have a handle 7, the handle 7 being able to extend substantially in a gripping direction G which may extend in an inclined or transverse manner relative to the insertion direction R. The end 5 of the charging plug 1 directed away from the plug face 2 may be directed in the gripping direction G and the charging cable 6 may extend counter to the gripping direction G into the handle 7 of the charging plug 1.

The portion of the charging plug 1 which extends parallel with the insertion direction R and transversely relative to the handle 7 may be designated as an insertion portion 8 of the charging plug 1. The insertion portion 8 and the handle 7 may merge into each other in an actuation portion 9 of the charging plug 1. The actuation portion 9 may comprise an actuation element 10 which can be comfortably operable by a user of the charging plug 1 if the user holds the charging plug 1 in his hand using the handle 7. For example, the user may press the actuation element 10 with his thumb in the gripping direction G.

The actuation element 10 may be an actuation element of a catch device 11 of the charging plug 1. The catch device 11 may be constructed with a catch element 12 for engagement with a counter-catch element of a charging sleeve. The catch element 12 may be constructed as a catch hook which protrudes in the gripping direction G and in the direction towards the plug face 2 and which may form the end of the catch device 11 which is directed in the insertion direction R. The end of the catch device 11 opposite the catch element 12 may be formed by the actuation element 10. The catch device 11 may be constructed as a catch rocker switch so that a movement of the actuation element 10 in the gripping direction G leads to redirection of the catch element 12 counter to the gripping direction G.

The catch device 11 may be arranged at least partially in a catch chamber 13 and be protected against damage, for example, owing to engagement with lines or cables by the catch element 12. The catch chamber 13 may extend in the insertion direction R and be constructed so as to be open at least in the insertion direction R so that the catch element 12 is accessible for the counter-catch element. In particular, the catch element 12 may protrude in the insertion direction R from the catch chamber 13. Counter to the insertion direction R, the actuation element 10 may also protrude from the catch chamber 13 so that it can easily be reached. Transversely relative to the insertion direction R and in particular in the gripping direction G and in the opening direction O, the catch chamber 13 may be delimited by a catch chamber wall 14 which may form at least a portion of an outer housing wall 15 of the charging plug 1. The catch chamber wall 14 may delimit the catch chamber 13 in such a manner that it forms a catch channel K which extends in the insertion direction R.

The charging plug 1 may be constructed with an opening 16 which may be arranged in the region of the actuation portion 9. The opening 16 may open in the outer housing wall 15 and may be directed in an opening direction O which extends in an inclined or transverse manner relative to the insertion direction R and the gripping direction G. The opening 16 may lead continuously into the interior of the charging plug 1 in the opening direction O. The opening 16 may extend as far as the catch chamber 13.

The charging plug 1 may be formed from a plurality and in particular from two housing portions which can be connected to each other along a connection seam 17. The connection seam 17 may be arranged so as to extend in a plane, the plane being able to extend in the insertion direction R and the gripping direction G substantially centrally through the charging plug 1.

Figure 2:
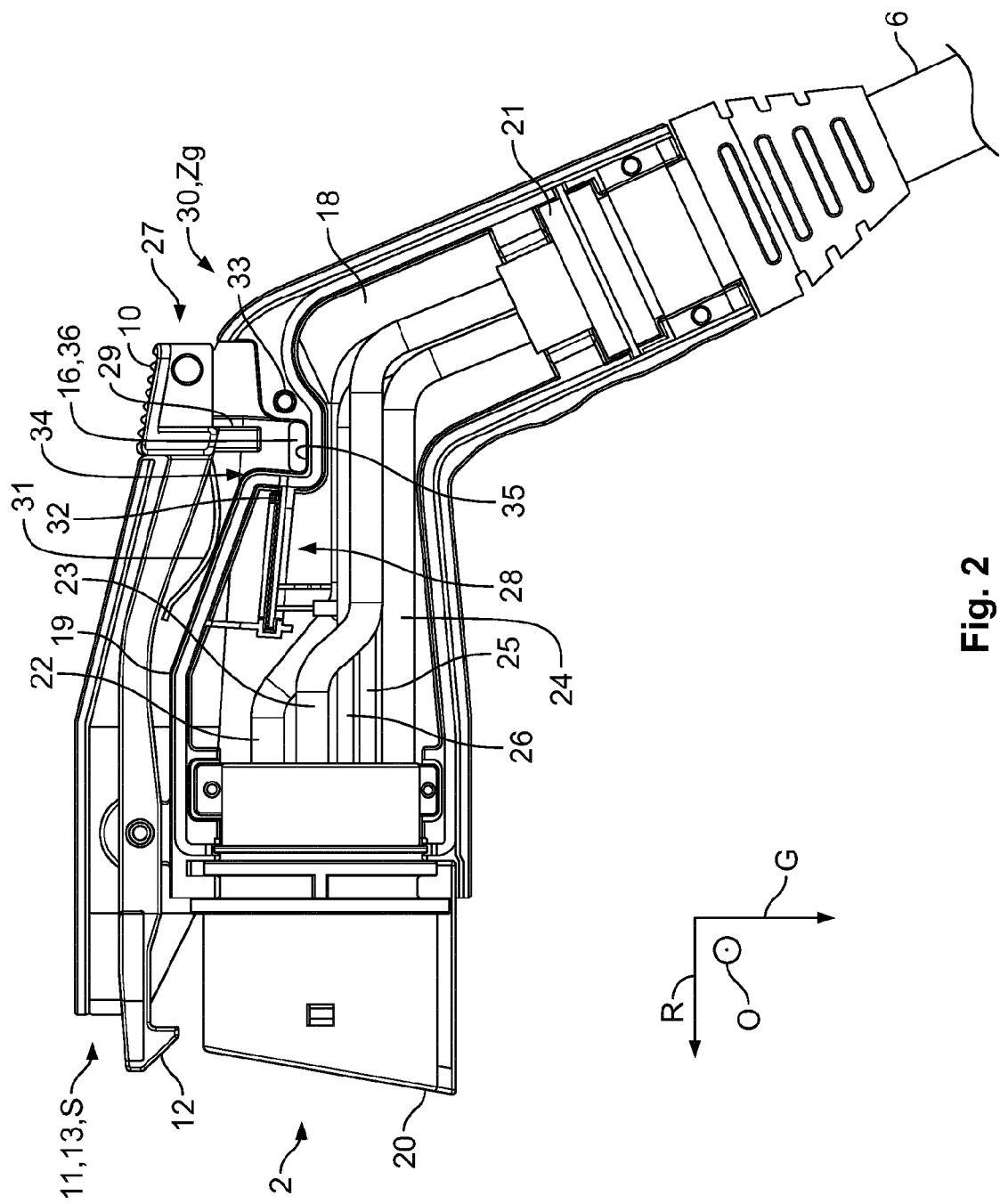
FIG. 2 is a schematic sectioned view of the charging plug of the embodiment of FIG. 1.

FIG. 2 is a sectioned view of the embodiment of the charging plug 1 illustrated in FIG. 1, the plane of section corresponding to the plane which is defined by the insertion direction R and the gripping direction G.

FIG. 2 is a sectioned illustration of only the handle 7 and the actuation portion 9 and the insertion portion 8 of the charging plug 1. The catch chamber 13 may extend in an insertion direction R along a conduction chamber 18, the catch chamber 13 and the conduction chamber 18 being able to be separated from each other by a sealing wall 19. The sealing wall 19 may be constructed in such a manner that it surrounds the conduction chamber 18 at least partially in a sealing manner so that the conduction chamber 18 is enclosed in particular against the introduction of moisture. In the insertion direction R, the sealing wall 19 may engage continuously around an insertion sleeve 20 which forms the plug face 2 and transversely relative to the insertion direction R in a sealing manner and may be adhesively bonded, for example, to the insertion sleeve 20.

At an end of the conduction chamber 18 directed in the gripping direction G, the sealing wall 19 may be connected and, for example, adhesively bonded, to a sleeve 21 in a sealing manner, the charging cable 6 being able to be guided into the conduction chamber 18 in a state sealed by the sleeve 21.

FIG. 2 illustrates only a portion of the charging plug 1, this portion being able to be constructed as a half-shell of the charging plug 1. A second half-shell of the charging plug 1 may be placed onto the illustrated half-shell in such a manner that the charging plug 1 is produced. Along the sealing wall 19, the half-shells can be connected and in particular adhesively bonded to each other in a fluid-tight manner.

Therefore, the conduction chamber 18 may be enclosed so as to be protected against external influences and in particular against introduction of moisture. Lines which extend through the conduction chamber 18, for example, charging energy lines 22, 23, an earthing line 24 or signal lines 25, 26, can thus be protected from moisture or contamination inside the charging plug 1.

The charging plug 1 may have a switching device 27, in accordance with the switching state of which the supply with charging energy may take place. The switching device 27 may be connected in an electrically conductive manner to one of the plug contacts and in particular to the additional plug contact 4 and to one of the lines, in particular to the earthing line 24. In a closed switching state of the switching device 27, the switching device 27 can connect the plug contact 4 and the earthing line 24 to each other, for example, via the signal line 25. In an open switching state of the switching device 27, the plug contact 4 and the earthing line 24 can be electrically separated from each other.

The switching device 27 may comprise a switching member 28 which may be arranged inside the conduction chamber 18. The switching member 28 may be directly connected to one of the plug contacts 3, 4 or to one of the lines 22 to 26 and in particular to the additional plug contact 4 and the earthing line 24. Thus, the switching member 28 is protected from moisture in the conduction chamber 18 so that corrosion or electromigration occur in a manner which is at least substantially slowed down.

In order to be able to influence the switching state of the switching member 28, the switching device 27 may comprise an actuation member 29. The actuation member 29 may be able to be actuated by the user of the charging plug 1 and to this end be connected, for example, to the actuation element 10 so as to transmit movement. For example, the actuation member 29 may be fixed to the actuation element 10. If the actuation element 10 is constructed as an injection-moulded component, the actuation element 10 may be at least partially injected around the actuation member 29.

In order not to endanger the sealing effect of the sealing wall 19, the sealing wall 19 may be constructed in a continuous manner in particular in the region of the switching device 27. Therefore, a direct mechanical modification of the switching state of the switching member 28 by the actuation member 29 is not possible. Consequently, the switching member 28 and actuation member 29 may be constructed in such a manner that they influence the switching state without interacting mechanically with each other.

The switching state of the switching member 28 may be dependent on the position of the actuation member 29 relative to the switching member 28. In FIG. 2, the actuation member 29 is illustrated in a closed position 30 which is arranged with spacing from an open position of the actuation member 29. In this closed position 30, the catch device 11 may be arranged in a secured position S in which the catch element 12 may be engaged with the counter-catch element. The switching member 28 may form a closed switching state Zg. The closed position 30 or the secured position S may be secured by a resilient element 31.

The resilient element 31 may be arranged between the catch device 11 and the sealing wall 19 and be supported on the sealing wall 19 and press the actuation element 10 into the secured position S.

So that the switching member 28 and the actuation member 29 can interact with each other in a contact-free manner, the switching member 28 may have a switching sensor 32 which converts physical environmental properties into changes of the switching state. For example, the switching sensor 32 may be constructed as a light sensor. In order to also be able to change the switching state in the case of a non-transparent sealing wall 19, the switching sensor 32 may be a magnet sensor and, for example, a reed contact. Furthermore, the switching device 27 may have a switching source 33 which brings about the physical properties. The switching source 33 may be a light source. If the sealing wall 19 is not transparent, the switching source 33 may be constructed, for example, as a magnet. In order to avoid a separate electric current supply of the switching source 33, in order to bring about the physical properties on the switching sensor 32, the switching source 33 may be constructed in particular as a permanent magnet.

In particular the strength of the physical properties acting on the switching sensor 32 can be varied in order to change the switching state. To this end, the actuation member 29 can be constructed so as to influence the transmission of the physical properties from the switching source 33 to the switching sensor 32. In the illustrated closed position 30, the actuation member 29 may optionally have less influence on the transmission of the physical properties than in the open position, in which the actuation member 29 may be arranged closer to the switching member 28 or on the switching source 33. The open position is illustrated in FIG. 3.

The switching source 33 may be arranged inside or outside the conduction chamber 18. According to the embodiment of FIG. 2, the switching source 33 may be embedded in the sealing wall 19. Between the switching source 33 and the switching member 28, there may be arranged an actuation region 34 which may adjoin the catch chamber 13. The actuation region 34 may open counter to the gripping direction G with respect to the catch chamber 13 so that the actuation member 29 can be introduced in the gripping direction G into the actuation region 34 when the actuation element 10 is pressed in the gripping direction G. The actuation region 34 may be constructed, for example, in a pot-like manner. The opening 16 may be arranged in the region of a base 35 of the pot-like actuation region 34. Should moisture accumulate in the actuation region 34, it can flow away through the opening 16. Other contamination may also be removed through the opening 16. So that the contamination can be rinsed out of the actuation region 34 in a simple manner, the opening 16 may extend along a cleaning channel or tunnel 36 which may extend completely through the charging plug 1 or through the catch chamber 13 in an opening direction O. The cleaning channel or tunnel 36 may thus be open in and counter to the opening direction O and extend through the outer housing wall 15 of the charging plug 1.

In FIG. 2, the catch device 11 is illustrated in the secured position S, the actuation member 29 in the closed position 30 and the switching member 28 in the closed switching state Zg.

Figure 3:
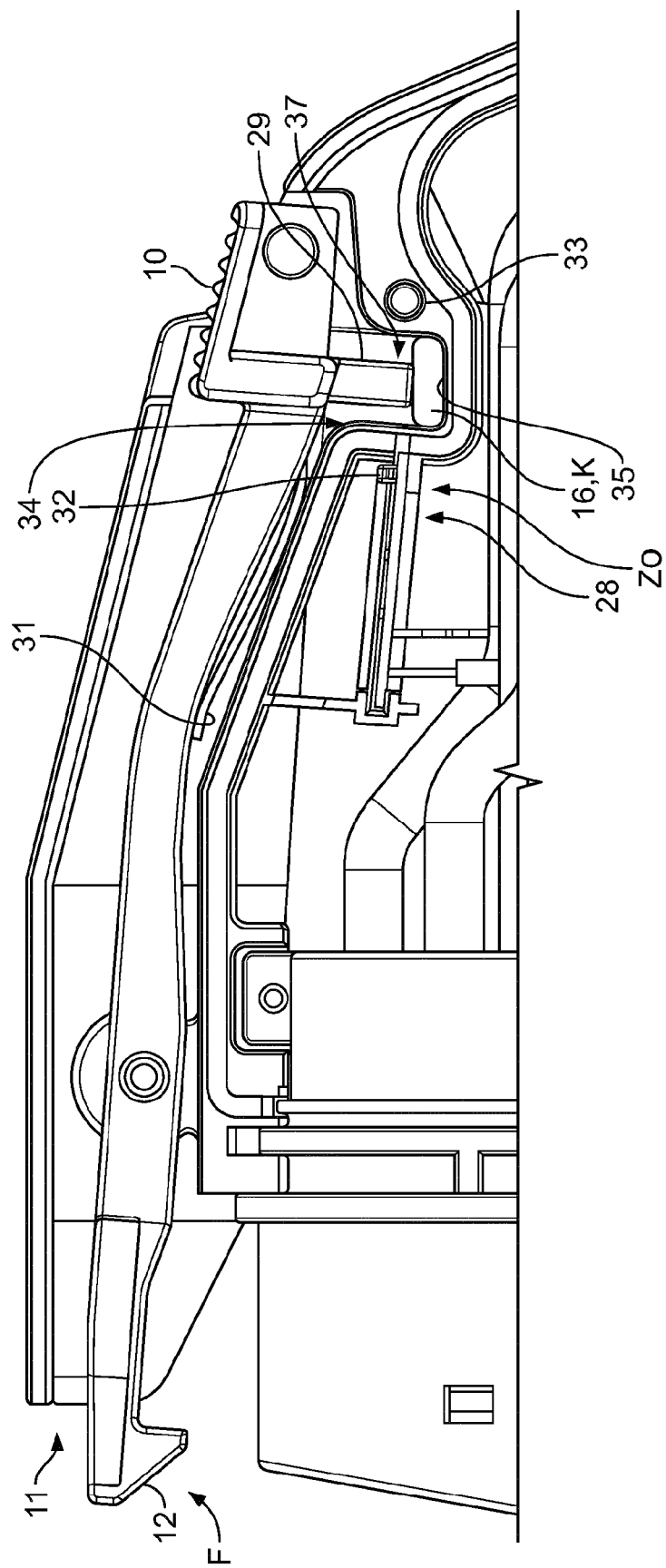
FIG. 3 is an enlarged cut-out of the sectioned illustration of FIG. 2.

FIG. 3 illustrates the embodiment of FIG. 2 in the open switching state Zo of the switching member 28. In the open switching state Zo, the switching member 28 does not connect any of the lines 22 to 26 to each other. In order to move the switching member 28 from the closed switching state Zg into the open switching state Zo, the intensity of the physical property which is brought about by the switching source 33 and acts on the switching sensor 32 is intended to be changed, and in particular reduced. To this end, the actuation member 29 may be arranged in the open position 37. In the open position 37, the actuation member 29 may be displaced with reference to the closed position 30 in the gripping direction G further into the actuation region 34 and in particular in the direction towards the base 35 thereof. Any contamination present in the actuation region 34 before the movement of the actuation member 29 can be removed beforehand through the opening 16. The cleaning channel 36 may in particular be arranged between the switching member 28 and the switching source 33 for this purpose.

The actuation member 29 may be produced from a magnetically soft material so that it damps the strength of the magnetic field which is brought about by the switching source 33 and acts on the switching sensor 32. Consequently, with a correspondingly great damping action, the reed contact may open and the switching member 29 may form the open switching state Zo.

As a result of the movement of the actuation member 29 or the actuation element 10 in the gripping direction G, the catch element 12 is moved from the secured position S into the released position F. In the released position F, the charging plug 1 can be removed from the charging socket. The release of the catch connection may be recognised owing to the change of the switching state and the charging energy may be switched off before the charging plug 1 and charging socket are electrically separated from each other. Switching or contact electric arcs can thus be prevented when the plug type connection is separated. Electric arcs can also be prevented when the charging plug 1 and the charging socket are joined together since the catch device 11 is at least temporarily arranged in the released position F during the insertion operation and the actuation member 29 is consequently arranged in the open position 37. The switching state of the switching member 28 is at least then the open switching state Zo.

In order to protect the connection of the charging plug 1 and charging socket against unintentional separation, the resilient element 31 may be compressed to a greater extent in the released position F than in the secured position S so that the resilient element 31 seeks to press the catch device 11 from the released position F into the secured position S.

The invention claimed is:

1. Charging plug for connection in an insertion direction to a charging socket of a device which is intended to be supplied with electrical charging energy or which provides the charging energy, having at least one plug contact which can be connected to a charging energy line so as to conduct charging energy, and having a switching device, in accordance with the switching state of which the supply with charging energy takes place, the switching device being constructed with a switching member which has a closed switching state and an open switching state and with an actuation member for influencing the switching state, wherein the switching member is arranged inside and the actuation member is arranged outside an enclosed conduction chamber of the charging plug, the switching member has a switching sensor which converts physical environmental properties to changes in switching state and the switching device has a switching source which brings about the physical properties, the strength of the physical properties on the switching sensor being dependent on the position of the actuation member relative to the switching member, the switching sensor and the switching source being fixed in a sealed portion of the charging plug and the actuation member being movable relative to the switching sensor and the switching source.

2. Charging plug according to claim 1, wherein the actuation member and the switching member interact with each other in a contact-free manner so as to influence the switching state.

3. Charging plug according to claim 1, wherein the switching state is dependent on a position of the actuation member relative to the switching member.

4. Charging plug according to claim 1, wherein the actuation member is arranged in one of the switching states at least partially between the switching source and the switching sensor.

5. Charging plug according to claim 1, wherein the switching sensor is constructed as a magnet sensor, the switching source as a magnet and the actuation member as a member which influences the magnetic field of the magnet.

6. Charging plug according to claim 1, wherein the charging plug is constructed with an actuation element which can be manually actuated and to which the actuation member is fixed.

7. Charging plug according to claim 6, wherein the actuation element is an actuation element of a catch device of the charging plug for securing the connection between the charging plug and charging socket, the catch device being arranged outside the conduction chamber and the actuation element being positioned in one of the switching states in a secured position and in the other switching state in a released position.

8. Charging plug according to claim 7, wherein the charging plug has a catch chamber which is arranged outside the charging chamber and which is at least partially open and which is open at least in the insertion direction and closed at least partially by a catch chamber wall of the charging plug transversely relative to the insertion direction, the catch device being arranged at least partially in the catch chamber.

9. Charging plug according to claim 8, wherein the catch chamber is adjoined by a through-opening which is arranged in the catch chamber wall in the region of the switching device.

10. Charging plug according to claim 9, wherein the through-opening is arranged in the insertion direction between the switching source and the switching sensor.

11. Charging plug according to claim 9, wherein the through-opening is constructed as a cleaning channel which makes the catch chamber accessible from the outer side of the charging plug.

12. Charging plug according to claim 1, wherein the conduction chamber is at least partially surrounded by a sealing wall.

13. Charging plug according to claim 12, wherein the charging plug is constructed with a resilient element which is pressed in a resilient manner against the sealing wall in the released position and which seeks to press the actuation element from the released position into the secured position.

14. Charging plug according to claim 1, wherein the sealed portion of the charging plug is defined by a sealing wall which houses the switching sensor and the switching source.

15. Charging plug according to claim 14, wherein the sealing wall defines an actuation region positioned intermediate the switching sensor and the switching source.

16. Charging plug according to claim 15, wherein the actuation member may extend into the actuation region to separate the switching sensor from the switching source.

* * * * *